July 10, 1951     A. L. CLEMENT     2,560,086
PLANTER
Filed Aug. 10, 1949
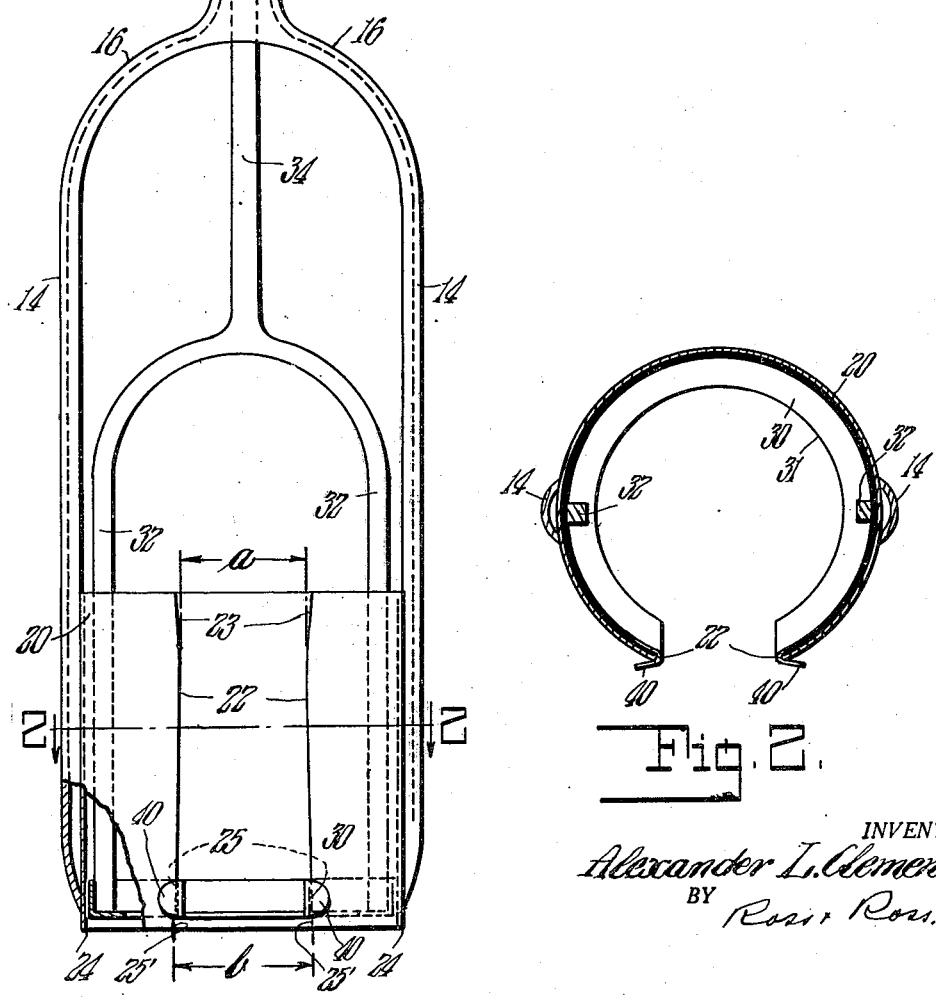
INVENTOR.
Alexander L. Clement.
BY Ross & Ross.

Patented July 10, 1951

2,560,086

UNITED STATES PATENT OFFICE 2,560,086

PLANTER

Alexander L. Clement, South Hadley Falls, Mass.

Application August 10, 1949, Serial No. 109,460

2 Claims. (Cl. 294—50.7)

My invention relates to new and useful improvements in a transplanting tool and is directed more particularly to the provision of a device which may be forced into the ground for cutting a section of the soil around the roots of a plant or tree and for cutting the roots so that the whole may be raised by the tool and removed to another area where it is replanted and to an improvement in the means for accomplishing the same.

It is the principal object of my invention to provide a novel and improved construction of the type in which the device may be used not only for removing trees or plants with the soil around the roots held intact but also for transporting such plants or trees and there is the further provision of a longitudinally split cylindrical member adapted to embrace any size of plant so as to provide a device which will operate with a maximum amount of ease and with a minimum degree of effort.

With the above primary object in view, it is another object of my invention to provide a construction of the above described character which is relatively simple and compact in accordance with the demands and desires of the purchasing public as well as of the manufacturers thereof and which is not only attractive in its appearance and practical in its value but also reliable in its operation and thoroughly efficient in its use.

It is a still further object to provide a device which is constructed of relatively simple parts which are adapted to be readily assembled and which when once assembled are positively and securely retained in operative relationship and which cannot be readily separated from each other, either accidentally or otherwise.

Accordingly, I have devised a novel means whereby the difficulties and objections of prior art devices are overcome.

Other prime objects of my invention include: first, the provision of a simplified construction and arrangement of a transplanting device which is strong, durable and compact in its structure and is distinctive in its appearance; second, the securement of a higher degree of accuracy in the manner of work performed therewith than has heretofore been possible with prior devices known in the art; third, the attainment of a higher degree of speed of construction and assembly of the device due to its simplification in design and its unique composition of parts; fourth, the attainment of a flexibility of a capability of adjustment by which a large variety of work can be ..ced by means of the same device; fifth, the achievement of a greater ease in adjustment and repairs; sixth, the provision of an improved transplanting device which may be made more economically and with fewer operations in the manufacture of its parts, as well as in the assembly of the same, than prior devices known in the art, and seventh, the provision of a construction which may be readily installed with respect to the various purposes for which it is intended.

As a still further object of my invention the device may be produced in miniature as a child's toy for purposes of making mud pies or the like.

All of the above objects I accomplish by means of such structure and relative arrangement of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Fig. 1 is a side elevational view of the device of my invention; and

Fig. 2 is a sectional plan view along the line 2—2 of Fig. 1.

In the above mentioned drawing annexed hereto and forming a part of this specification, I have shown but one embodiment of my invention which is deemed preferable, but it is to be understood that changes and modifications may be made within the scope of the appended claims without departing from the spirit of the invention.

Referring now to the drawing more in detail, and referring more particularly to the preferred form of my invention selected for illustrative purposes, I have shown a hollow shank 10 which is provided with an offset handle portion 12 which may be integral therewith as shown or may be separate therefrom and secured at the upper end thereof by any conventional means. The portion 12 may have a thumb latch portion as shown.

A pair of arms 14 extend downwardly from the lower end of the shank 10 and may be integral therewith as shown or may be separate therefrom and secured at the lower end thereof in any conventional manner.

The arms 14 are bowed outwardly from the shank 10 as shown at 16 and 16 and are thence disposed in parallel relation downwardly for the greater portion of their lengths all as may be observed by reference to Fig. 1.

A substantially cylindrical member 20 is split longitudinally along one side thereof so as to provide a substantial opening therealong whereby the member 20 may be expanded appreciably in a manner and for a purpose as will shortly be described.

The lower edge portion 24 of the member 20 is beveled to facilitate the insertion of the member 20 into the ground.

The lower extremities of the arms 14 are fixed to the outside circumference of the member 20 in any desired manner.

A ring or annular piston 30 is fitted to move within the inner circumference of the member 20 and has secured to the upper sides thereof a forked bracket 32 which in turn is connected at its upper end to a piston member 34 which rides within the hollow shank 10 as shown.

The upper portion of the member 34 extends outwardly through an opening 11 in the shank 10 and the extremity 36 of the member 34 may be offset relative to the main body portion whereby movement of member 34 relative to the member 10 may be limited. That is to say, the extremity 36 of the member 34 may not extend below the handle portion 12 of the member 10, the members coming into abutment with each other as shown in Fig. 1 so as to preclude downward movement of the member 34 beyond this limiting point. At this point in the stroke, the member 30 is at the lower edge of the member 20 as shown in Fig. 1.

The piston member 30 is arranged transversely of the cylinder and is adjustable or slidable therein between the lower or down position described above and an upper position wherein the piston 30 moves to the top edge of the cylinder. The upward stroke is limited by the abutment of the members 32 against the members 16.

The piston member 30 has a central opening 31 therein and is used as a dirt tamper or expeller. That is to say, when in operation the piston member is raised to the top of the cylinder whereupon the cylinder is inserted into the ground. As the cylinder is removed, the dirt and plant are retained within the cylinder. When the cylinder has been thus withdrawn, the member 30 will expel the soil and plant when pushed downwardly by means of the member 34 which is manually engageable at 36.

As a special feature of the invention, the opening along one side of the cylinder is such as to provide opposite end walls 22 and 22 in parallel spaced relation throughout the greater portion of their length as shown by the arrow $a$.

The upper extremities 23 and 23 of the walls 22 and 22 are tapered outwardly in slightly diverging relation as shown in Fig. 1 whereby the uppermost edges 23' and 23' of the walls 22 and 22 are spaced slightly further apart than the distance $a$.

The lower extremities 25 and 25 of the walls 22 and 22 are likewise tapered outwardly in slowly diverging relation whereby the lowermost edges 25' and 25' of the walls 22 and 22 are spaced apart at a distance shown by $b$ which, as will be appreciated, is slightly greater than distance $a$.

Lip portions 40 on each side of the split piston 30 extend outwardly therefrom in a flaring manner so as to embrace the cylinder 30 at the edges 22 and 22 as best shown in Fig. 2.

As the piston 30 is raised upwardly the lip portions which loosely embrace the edges 25 and 25 are brought into closer adjacency with the edges 22 and 22 whereby the opposite walls are urged outwardly by the wedging action.

As the piston is raised to the top of the cylinder, the pressure exerted against the edges 23 and 23 is diminished whereby the piston and the cylinder wall are loosely held as to each other.

The cylinder is then ready for insertion into the ground for the transplanting operation. As it is removed, soil and the plant therein are removed with it.

As the device is moved to another area for the transplanting and as the piston is urged downwardly the wedge action urges the opposite walls of the cylinder outwardly so as to free the dirt from the cylinder walls.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A transplanting tool comprising in combination, a sheet of relative thin metal formed into the shape of a vertical hollow cylinder having adjacent vertical longitudinal free edges spaced apart and providing a vertical slot in the forward side thereof extending from lower to upper end of said cylinder, a hollow vertical shank above said cylinder having diverging lower portions secured to said cylinder at opposite sides thereof and an upper grip portion extending horizontally therefrom, an angular ring-like member slidable up and down in said cylinder provided with a slot in a side thereof on alignment with the slot of the cylinder and lip portions at opposite sides of said slot for slidably engaging the longitudinal edges of the cylinder, and a member slidable up and down in said shank having lower portions secured to opposite sides of said ring-like member and an upper extremity disposed above the upper extremity of said shank, said last named extremity adapted to alert said first-named extremity when said ring-like member is in lower position in the cylinder and prevent movement of the ring-like member through the lower end of said cylinder, the longitudinal sides of the cylinder at the sides of the slot thereof and said lips arranged whereby as the ring-like member is elevated in the cylinder said slot is gradually widened by said lips and opposite walls of the cylinder are urged away from one another and finally at the upper position of the ring-like member in the cylinder said slot narrows and opposite walls of the cylinder move towards one another.

2. A transplanting tool comprising in combination, a vertical hollow cylinder having adjacent vertical longitudinal free edges spaced apart and providing a vertical slot in the forward side thereof extending through the length of said cylinder, a hollow vertical shank above said cylinder having diverging lower portions secured to said cylinder at opposite sides thereof, a grip portion at the upper end of said shank, an annular ring-like member slidable up and down in said cylinder provided with a slot in a side thereof in alignment with the slot of said cylinder and having lip portions at opposite sides of the slot for slidably engaging the longitudinal free edges of said cylinder, and a member slidable up and down in said shank having lower portions secured to opposite sides of said ring-like member and an upper extremity disposed above the said shank and adapted to alert said first-named extremity when said ring-like member is in lower position in said cylinder and to prevent movement of said ring-like member through the lower end of said cylinder, the longitudinal sides of said cylinder at the sides of the slot thereof and said lips arranged whereby as said ring-like member is elevated in said cylinder the slot is gradually widened by said lips and opposite walls of said cylinder are urged away from one another and finally at the upper position of said ring-like member in said cylinder said slot narrows and opposite walls of said cylinder move towards one another.

ALEXANDER L. CLEMENT.

REFERENCES CITED

The following references are of record in the file of this patent:

UNITED STATES PATENTS

| Number | Name | Date |
|---|---|---|
| 969,701 | Jaynes | Sept. 6, 1910 |
| 2,361,236 | Preece | Oct. 24, 1944 |